UNITED STATES PATENT OFFICE 2,613,152

PHONOGRAPH RECORD

Philip C. Doyle, Rocky River, Ohio, and Kenneth H. Rudd, Mount Lebanon, Pa., assignors to The Standard Oil Company, Cleveland, Ohio, a corporation of Ohio No Drawing. Application June 30, 1948,
Serial No. 36,296

4 Claims. (Cl. 106—37)

The present invention relates to phonograph records in which the binder comprises wax tailings and a resinous plastic material having a natural animal or vegetable resin, such as shellac, a copal resin, a pinewood or "Vinsol" resin, or a combination thereof, as the primary component.

It is well known that phonograph records are conventionally made by molding compositions consisting of from about 15–50% of a binder and the balance filler. In these molding compositions, the binder usually comprises one or more natural or artificial resins and, if necessary, a plasticizer or lubricant, and the filler includes pulverized substances such as limestone, slate and marble dust, carbon black and fibrous materials such as cotton or asbestos flock or fibers. Frequently such molding compositions are combined with appreciable quantities of record scrap, which is a mixture of the binder and filler.

It is also known that fairly large quantities of wax tailings are available in the petroleum industry for which little use has been found despite considerable efforts that have been made in this direction. The production of such material often yields little or no income to the petroleum industry, but, on the contrary, has hitherto constituted a liability in that it has increased the cost of other marketable cracking products.

Wax tailings is a petroleum derived hydrocarbon material made by the dry distillation of non-asphaltic or semi-asphaltic petroleum and is the last fraction to be distilled over from the still before coke is formed. It is peculiar in its properties and generally free from paraffin wax. It is easily recognized by its yellow color and can be readily distinguished from fractions which distill over before the wax tailings. Upon cooling it forms a very viscous semi-liquid to sticky semi-solid of a characteristic yellow to yellowish-brown color.

If desired, the wax tailings can be reduced with steam to eliminate the more volatile components as is well understood in the art. The wax tailings can be blown with air so as to cause a condensation which raises the softening point of the wax tailings. By such air blowing the penetration can be reduced down to zero and the melting point correspondingly increased. The utilization of such oxidized wax tailings in accordance with this invention raises the temperature to which the blend can be subjected before softening and is included within the term "wax tailings" as used herein.

As illustrative of properties of wax tailings made at refineries at Lima, Ohio, and Toledo, Ohio, the following table is included:

| Type of Material | Steam Reduced Wax Tailings (Lima) | Steam Reduced and Oxidized Wax Tailings (Lima) | Steam Reduced Wax Tailings (56.5% Toledo and 43.5% Lima) | Oxidized Wax Tailings (Lima) |
|---|---|---|---|---|
| Sample Number | #3 | #4 | #3A | #C |
| Softening Point (R. & B.) | 118° F. | 154° F. | 156° F. | 220°–210° F. |
| Penetration at 77° F. (100 g., 5 sec.) | 48 | 1 | 31 | 0 |
| Specific Gravity at 77° F. | 1.118 | 1.134 | 1.144 | 1.177 |

It has now been found that phonograph records having excellent impact strength and flexure characteristics can be made by using as a binder a resinous composition comprising wax tailings as an essential ingredient in admixture with one or more natural, animal or vegetable resins, such as shellac, a copal resin and a "Vinsol" resin that is gasoline-insoluble, and is derived from the dark-colored residue concurrently removed with F. F. wood rosin after extraction of pine chips with a coal tar hydrocarbon solvent such, for instance, as benzene, toluene and xylene, precipitating the gasoline-insoluble hydrocarbon fraction by addition of a saturated paraffinic hydrocarbon and separating the precipitate by filtration (see Patents Nos. 2,287,351 and 2,287,352).

It is surprising that one or more of the resins conventionally used in the preparation of molding compositions for phonograph records can be substituted in this manner by wax tailings because the latter is known to possess very little tenacity of itself and would therefore not be expected to impart sufficient strength to such compositions after molding to make them suitable for such use.

The primary advantage of the present invention is that it provides a binder suitable for use in the manufacture of phonograph records that is less expensive than any that has hitherto been available without deleteriously affecting the physical characteristics of the products molded therefrom.

This and other advantages, as well as the objects and utility of the invention, will become more readily apparent from the detailed disclosure hereinafter.

The proportion of wax tailings in the binder composition of this invention may vary widely and is dependent upon the softening point and penetration of the particular wax tailings used, the characteristics and relative proportions of the other resins in the compositions, the presence or absence of plasticizers in the composition, the proportions in which the binder composition is to be used in relation to the proportions of filler and record scrap and the properties desired in the final product that is molded. Generally, however, it has been found desirable to include within the binder composition a minor proportion, i. e., generally less than about 50% but not less than about 5% by weight of wax tailings having a softening point above 115° F. and preferably between about 150° and 210° F.

When proportions in the upper portion of this percentage range are used, however, it is desirable to include minor amounts of a hardening resin, such as ethyl cellulose, especially when wax tailings having a softening point in the vicinity of 115° F. are used. Stated in another way, the inclusion of minor amounts of such a hardening resin permits the inclusion of larger proportions of wax tailings without sacrificing hardness in the phonograph records molded from the ultimate molding composition.

The remainder of the binder composition includes a resinous plastic material, such as shellac, a copal resin, or "Vinsol" resin, or a combination of any two or three of said resins, and, if desired, other resinous materials such as polyvinyl chloride polymers, vinylidene chloride polymers, copolymers of vinyl chloride and vinyl acetate, and wax.

The proportions in the binder composition of the resinous plastic material may likewise vary within wide limits depending upon the proportion and softening point of the wax tailings, the physical properties of the particular resin or resins and the characteristics desired in the final molded product. It has generally been found desirable to include a major proportion, i. e., generally more than about 50% but not more than about 95% by weight of said resinous plastic material in the binder composition.

Any plasticizer may be used that is compatible with the natural resins used in the binder composition; the nature of these is well understood in the art. Particularly satisfactory plasticizers are stearates such as zinc stearates and plasticizers of the ester type, such as di-octyl phthalate, di-butyl phthalate, di-butyl sebacate, tri-cresyl phosphate, methyl abietate, triphenyl phosphate and similar esters. Chlorinated esters, aromatic ethers and ketones also may be employed, as is well understood. The amount of the plasticizer, as is likewise well understood by those skilled in the art, may vary considerably and is necessarily dependent upon the plasticity and other characteristics of the particular plasticizer used and upon the plasticity desired in the final blend. The amount is always a minor proportion of the whole composition, generally less than 25%, and usually less than 10%. It is difficult to assign any range that is applicable to all plasticizers for all purposes but the amount is that which produces the desired plasticity without destroying the inherent plastic characteristics of the composition.

The presence of a plasticizer has the function of increasing the flexibility and impact strength of the molded article ultimately prepared and permits the material to be worked at lower temperatures.

The inclusion of a wax, such as Montan wax, has effects on the physical characteristics of the molded articles that are similar to those produced by the inclusion of a plasticizer. Generally it is sufficient to include up to about 1% to 5% by weight thereof in the binder composition, if this ingredient is to be used.

The preferred ranges of proportion of the various ingredients discussed above are expressed more conveniently in the following table:

|  | Parts by weight |
| --- | --- |
| Wax tailings | 5 to 50 |
| Resinous plastic composition | 50 to 95 |
| Plasticizer | 0 to 10 |
| Wax | 0 to 5 |

The composition described, when used as a binder for a molding composition designed for use in the manufacture of phonograph records, is preferably combined with fillers in proportions ranging from about 15 to about 50% by weight of the binder and the balance of fillers, the exact proportions being dependent upon the characteristics of the particular filler or fillers and upon the properties desired in the final product. Any inert fillers or colored pigments may be used as is well understood in the plastic molding art, such fillers including, for example, calcium silicate, talc, slate dust, limestone dust, magnesia, precipitated carbon, air blown chalk, fly ash, mineral flour, lignin, wood flour, clay, asbestos, cotton fiber and other organic or mineral fibrous material and such colored pigments including any of the well-known pigments, such as iron oxide, lead chromate and ultramarine, capable of giving the ultimate product the color that is desired.

In the manufacture of the phonograph records, molding compositions comprising a binder and filler in the proportion specified, may also be combined with record scrap preferably in proportions ranging from about 40% to about 55% by weight of record scrap, the balance being binder and filler. In this event, it is to be understood that since the record scrap may contain, if it is derived from old records, from 15 to 50% binder having a conventional formula, the proportion of wax tailings in the ultimate molding composition may be correspondingly less than those specified previously.

Without intending to limit in any way the scope of the invention, the following examples are included to supplement the foregoing description. The materials specified in each of these examples were mixed thoroughly and molded into phonograph records which were found to have excellent impact and flexible strength and tonal qualities comparable to records made of conventional molding compositions.

*Example 1*

18.0 parts by weight of a binder consisting of:

|  | Parts by weight |
| --- | --- |
| Wax tailings (210° F. soft. pt.) | 3.0 |
| Congo copal resin | 4.8 |
| "Vinsol" resin | 2.4 |
| Shellac | 4.9 |
| Ethyl cellulose (containing 10% plasticizer) | 1.3 |
| Montan wax | 0.4 |
| Zinc stearate | 1.2 | were mixed with 42 parts by weight of a filler consisting of:

| | Parts by weight |
|---|---|
| Cotton flock | 1.2 |
| Limestone dust | 16.1 |
| Slate dust | 24.0 |
| Carbon black | 0.7 | and 41 parts by weight of record scrap of a similar composition.

Another molding composition, similar in every respect except that the ethyl cellulose containing plasticizer was replaced by an equal quantity of high melting copolymer of vinyl chloride and vinyl acetate was also prepared.

*Example 2*

18.0 parts by weight of a binder consisting of:

| | Parts by weight |
|---|---|
| Was tailings (210° F. soft. pt.) | 9.2 |
| Copolymer of vinyl chloride and vinyl acetate | 1.1 |
| Shellac | 4.8 |
| Ethyl cellulose (containing 10% plasticizer) | 1.3 |
| Montan wax | 0.4 |
| Zinc stearate | 1.2 | were mixed with 42 parts by weight of a filler consisting of:

| | Parts by weight |
|---|---|
| Cotton flock | 1.2 |
| Limestone dust | 16.1 |
| Slate dust | 24.0 |
| Carbon black | 0.7 | and 41 parts by weight of record scrap of a similar composition.

*Example 3*

18.0 parts by weight of a binder consisting of:

| | Parts by weight |
|---|---|
| Wax tailings (210° F. soft. pt.) | 7.1 |
| Congo copal resin | 4.8 |
| "Vinsol" resin | 2.4 |
| Polyvinyl chloride polymer | 0.8 |
| Ethyl cellulose (containing 10% plasticizer) | 1.3 |
| Montan wax | 0.4 |
| Zinc stearate | 1.2 | were mixed with 42 parts by weight of a filler consisting of:

| | Parts by weight |
|---|---|
| Cotton flock | 1.2 |
| Limestone dust | 16.1 |
| Slate dust | 24.0 |
| Carbon black | 0.7 | and 41 parts by weight of record scrap of a similar composition.

*Example 4*

19.6 parts by weight of a binder composition consisting of:

| | Parts by weight |
|---|---|
| Wax tailings (210° F. soft. pt.) | 2.5 |
| Shellac | 5.1 |
| Congo copal resin | 5.7 |
| "Vinsol" resin | 3.9 |
| Montan wax | 0.5 |
| Zinc stearate | 1.9 | were mixed with 32.8 parts by weight of a filler consisting of:

| | Parts by weight |
|---|---|
| Limestone dust | 9.5 |
| Slate dust | 19.0 |
| Cotton flock | 2.9 |
| Carbon black | 1.4 | and 47.6 parts by weight of record scrap.

*Example 5*

19.6 parts by weight of a binder composition consisting of:

| | Parts by weight |
|---|---|
| Wax tailings (210° F. soft. pt.) | 6.6 |
| Ethyl cellulose | 1.0 |
| Congo copal resin | 5.7 |
| "Vinsol" resin | 3.9 |
| Montan wax | 0.5 |
| Zinc stearate | 1.9 | were mixed with 32.8 parts by weight of a filler consisting of:

| | Parts by weight |
|---|---|
| Limestone dust | 9.5 |
| Slate dust | 19.0 |
| Cotton flock | 2.9 |
| Carbon black | 1.4 | and 47.6 parts by weight of record scrap.

*Example 6*

19.6 parts by weight of a binder composition consisting of:

| | Parts by weight |
|---|---|
| Wax tailings (210° F. soft. pt.) | 5.7 |
| Shellac | 7.6 |
| "Vinsol" resin | 3.9 |
| Montan wax | 0.5 |
| Zinc stearate | 1.9 | were mixed with 32.8 parts by weight of a filler consisting of:

| | Parts by weight |
|---|---|
| Limestone dust | 9.5 |
| Slate dust | 19.0 |
| Cotton flock | 2.9 |
| Carbon black | 1.4 | and 47.6 parts by weight of record scrap.

*Example 7*

19.6 parts by weight of a binder composition consisting of:

| | Parts by weight |
|---|---|
| Wax tailings (210° F. soft. pt.) | 3.9 |
| Shellac | 7.6 |
| Congo copal resin | 5.7 |
| Montan wax | 0.5 |
| Zinc stearate | 1.9 | were mixed with 32.8 parts by weight of a filler consisting of:

| | Parts by weight |
|---|---|
| Limestone dust | 9.5 |
| Slate dust | 19.0 |
| Cotton flock | 2.9 |
| Carbon black | 1.4 | and 47.6 parts by weight of record scrap.

*Example 8*

19.6 parts by weight of a binder composition consisting of:

| | Parts by weight |
|---|---|
| Wax tailings (210° F. soft. pt.) | 6.5 |
| Shellac | 5.1 |
| Congo copal resin | 4.2 |
| "Vinsol" resin | 1.9 |
| Zinc stearate | 1.9 | were mixed with 32.8 parts by weight of a filler consisting of:

| | Parts by weight |
|---|---|
| Limestone dust | 9.5 |
| Slate dust | 19.0 |
| Cotton flock | 2.9 |
| Carbon black | 1.4 | and 47.6 parts by weight of record scrap.

Example 9

11 parts by weight of a binder composition consisting of:

| | Parts by weight |
|---|---|
| Wax tailings (210° F. soft. pt.) | 5.5 |
| Shellac | 5.5 | were mixed with 32 parts by weight of a filler and 57 parts by weight of record scrap.

Example 10

20.9 parts by weight of a binder composition consisting of:

| | Parts by weight |
|---|---|
| Wax tailings (210° F. soft. pt.) | 4.0 |
| Shellac | 7.0 |
| Congo copal resin | 6.0 |
| Ethyl cellulose | 2.0 |
| Zinc stearate | 1.9 | were mixed with 29.1 parts by weight of a filler and 50 parts by weight of record scrap.

Example 11

21.9 parts by weight of a binder composition consisting of:

| | Parts by weight |
|---|---|
| Wax tailings (210° F. soft. pt.) | 10.0 |
| Congo copal resin | 6.0 |
| Ethyl cellulose | 4.0 |
| Zinc stearate | 1.9 | were mixed with 29.1 parts by weight of a filler and 50 parts by weight of record scrap.

It will be apparent that innumerable modifications and alterations may be made in the identity and relative proportions of the essential ingredients forming the phonograph records of this invention. All such variations and modifications will be apparent to those skilled in the art upon reading the present description and are intended to be included within the invention as defined in the appended claims.

We claim:

1. A phonograph record in which the binder comprises from 5 to 50 parts by weight of oxidized wax tailings having a softening point of at least about 210° F. and from 50 to 95 parts by weight of a resin selected from the group consisting of shellac, copal resin and a gasoline-insoluble resin obtained by extracting pine wood with a coal tar hydrocarbon solvent, precipitating the gasoline-insoluble fraction by addition of a saturated paraffinic hydrocarbon and separating the precipitated resin by filtration.

2. A phonograph record in which the binder comprises from 5 to 50 parts by weight of oxidized wax tailings having a softening point of at least about 210° F. and from 50 to 95 parts by weight of shellac.

3. A phonograph record in which the binder comprises from 5 to 50 parts by weight of oxidized wax tailings having a softening point of at least about 210° F. and from 50 to 95 parts by weight of a copal resin.

4. A phonograph record in which the binder comprises from 5 to 50 parts by weight of oxidized wax tailings having a softening point of at least about 210° F. and from 50 to 95 parts by weight of a gasoline-insoluble resin obtained by extracting pine wood with a coal tar hydrocarbon solvent, precipitating the gasoline-insoluble fraction by addition of saturated paraffinic hydrocarbon and separating the precipitated resin by filtration.

PHILIP C. DOYLE.
KENNETH H. RUDD.

REFERENCES CITED

The following references are of record in the file of this patent:

UNITED STATES PATENTS

| Number | Name | Date |
|---|---|---|
| 1,744,534 | Edison | Jan. 21, 1930 |
| 2,308,676 | Cummins et al. | Jan. 19, 1943 |
| 2,359,972 | De Bell | Oct. 10, 1944 |